(12) United States Patent
Huang et al.

(10) Patent No.: US 10,284,066 B2
(45) Date of Patent: *May 7, 2019

(54) VIBRATION MOTOR

(71) Applicant: AAC Technologies Pte. Ltd., Singapore OT (SG)

(72) Inventors: Dong Huang, Shenzhen (CN); Jinquan Huang, Shenzhen (CN); Zhilin Chai, Shenzhen (CN); Na Wu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 236 days.

This patent is subject to a terminal disclaimer.

(21) Appl. No.: 15/403,405

(22) Filed: Jan. 11, 2017

(65) Prior Publication Data

US 2017/0373577 A1 Dec. 28, 2017

(30) Foreign Application Priority Data

Jun. 23, 2016 (CN) .................... 2016 2 0631335 U

(51) Int. Cl.
*H02K 1/12* (2006.01)
*H02K 1/34* (2006.01)
*H02K 33/02* (2006.01)
*H02K 33/16* (2006.01)
*H02K 33/18* (2006.01)

(52) U.S. Cl.
CPC .............. *H02K 33/02* (2013.01); *H02K 1/12* (2013.01); *H02K 1/34* (2013.01); *H02K 33/16* (2013.01); *H02K 33/18* (2013.01)

(58) Field of Classification Search
None
See application file for complete search history.

(56) References Cited

U.S. PATENT DOCUMENTS

| | | | | |
|---|---|---|---|---|
| 9,048,718 | B2* | 6/2015 | Zhang | H02K 33/02 |
| 2011/0018365 | A1* | 1/2011 | Kim | B06B 1/045 |
| | | | | 310/17 |
| 2012/0169151 | A1* | 7/2012 | Dong | H02K 33/16 |
| | | | | 310/25 |
| 2017/0033664 | A1* | 2/2017 | Xu | H02K 33/16 |
| 2017/0033672 | A1* | 2/2017 | Xu | H02K 33/16 |
| 2017/0110948 | A1* | 4/2017 | Akanuma | H02K 33/00 |
| 2017/0110949 | A1* | 4/2017 | Akanuma | H02K 33/00 |
| 2017/0110951 | A1* | 4/2017 | Akanuma | H02K 33/16 |
| 2017/0144191 | A1* | 5/2017 | Mao | B06B 1/045 |
| 2017/0222532 | A1* | 8/2017 | Wang | H02K 33/16 |

(Continued)

*Primary Examiner* — Quyen P Leung
*Assistant Examiner* — Minki Chang
(74) *Attorney, Agent, or Firm* — Na Xu; IPro, PLLC

(57) ABSTRACT

A vibration motor includes a housing; a fixed component; an elastic connecting piece; and a vibrating component comprising a counterweight suspended by the elastic connecting piece. One of the fixed component and the vibrating component includes a coil, and the other includes a magnet. The vibration motor further includes a damping piece fixed on the counterweight and facing the elastic connecting piece. One of the counterweight and the damping piece is provided with a slot and a glue dispersing slot connecting with the slot, and a projecting part formed on the other of the counterweight and the damping piece for matching with the slot.

10 Claims, 4 Drawing Sheets

(56) References Cited

U.S. PATENT DOCUMENTS

| | | | | |
|---|---|---|---|---|
| 2017/0341108 A1* | 11/2017 | Mao | ............... | B06B 1/045 |
| 2017/0373578 A1* | 12/2017 | Wu | ............... | H02K 5/24 |
| 2018/0021812 A1* | 1/2018 | Akanuma | ............... | B06B 1/045 |
| | | | | 310/25 |
| 2018/0026506 A1* | 1/2018 | Zhang | ............... | H02K 33/16 |
| | | | | 310/25 |
| 2018/0026511 A1* | 1/2018 | Akanuma | ............... | H02K 35/02 |
| | | | | 310/20 |
| 2018/0297071 A1* | 10/2018 | Xu | ............... | H02K 33/00 |

* cited by examiner

VIBRATION MOTOR

FIELD OF THE INVENTION

The invention is related to the technology of vibration motors, especially a vibration motor applicable for portable consumer electronic products.

DESCRIPTION OF RELATED ART

The vibration motor is applied to feedback of the system generally, such as incoming call prompt, message prompt and navigation prompt of mobile phone, vibration feedback of game player, etc. for the portable consumer electronic products which are favored by more and more people along with development of the electronic technologies, such as mobile phone, handheld game player, navigation unit or handheld multimedia entertainment equipment, etc.

The vibration motor of relevant technology comprises a housing, a fixed component and a vibrating component arranged in the housing, as well as an elastic connecting piece for supporting the vibrating component elastically, wherein the vibrating component comprises a magnet and a counterweight for accommodating the magnet. One end of the elastic connecting piece is connected with the counterweight, and the other end is connected with the housing. A damping piece is always arranged between the vibrating component and the elastic connecting piece, and/or between the elastic connecting piece and the housing in the prior art in order to prevent the elastic connecting piece from being collided by the vibrating component during working or prevent the housing from being collided by the elastic connecting piece. Two ends of the counterweight is provided with a U-shaped slot usually for inserting the damping piece and allowing the glue to pass through to implement dispersion and fixation between the damping piece and the counterweight in order to fix the damping piece; the damping piece shall be inserted into the U-shaped slot first during fixation, and fixed afterward by means of dispensing the glue. Moreover, the performance of the product may fluctuate and the dispensing efficiency of the product and the percent of pass would be reduced when this structure is taken because the glue always exceeds the scope of the U-shaped slot of the counterweight.

Therefore, it is necessary to provide an improved vibration motor to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

Figure 1:
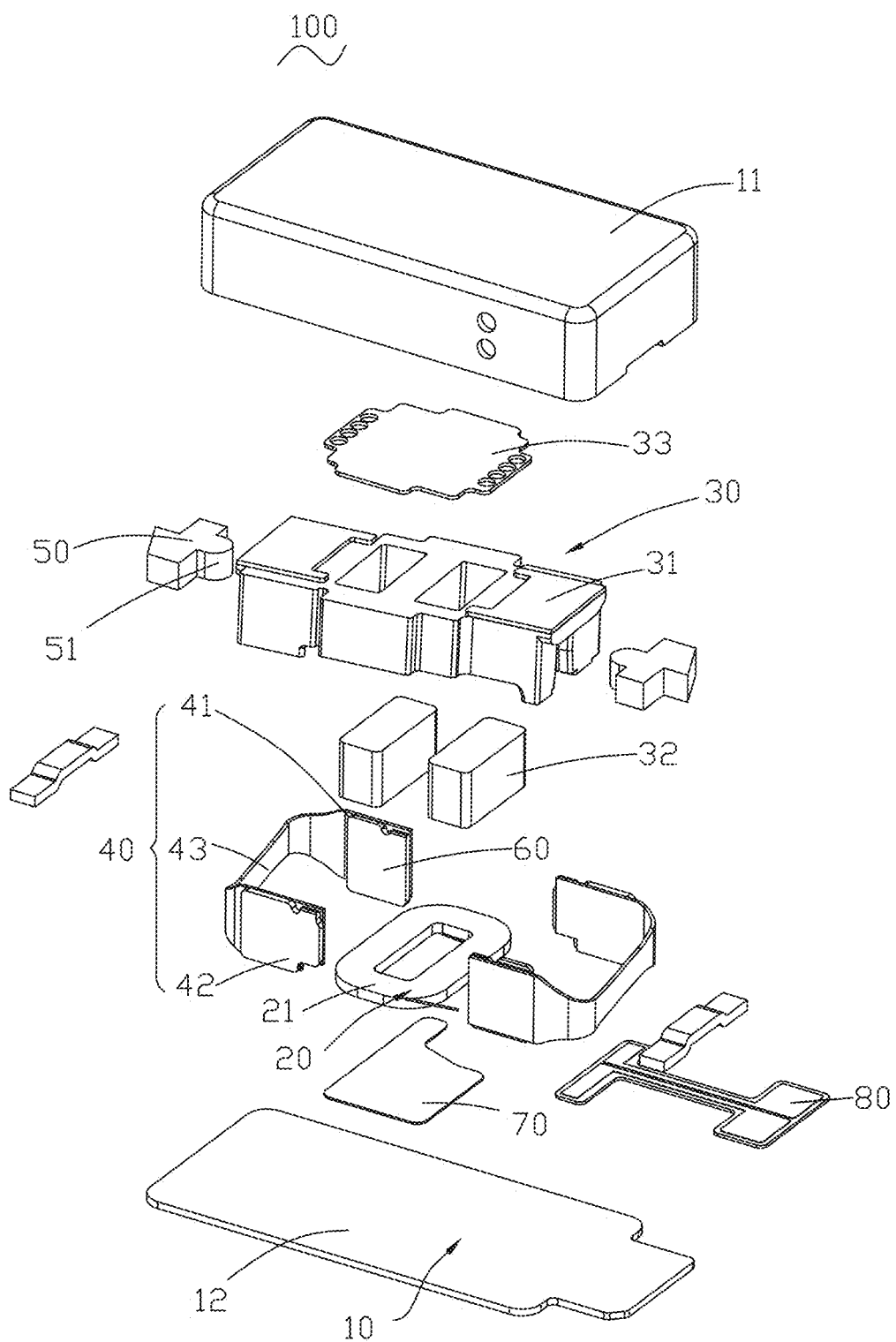
FIG. 1 is an exploded view of a vibration motor in accordance with an exemplary embodiment of the present disclosure.
Figure 2:
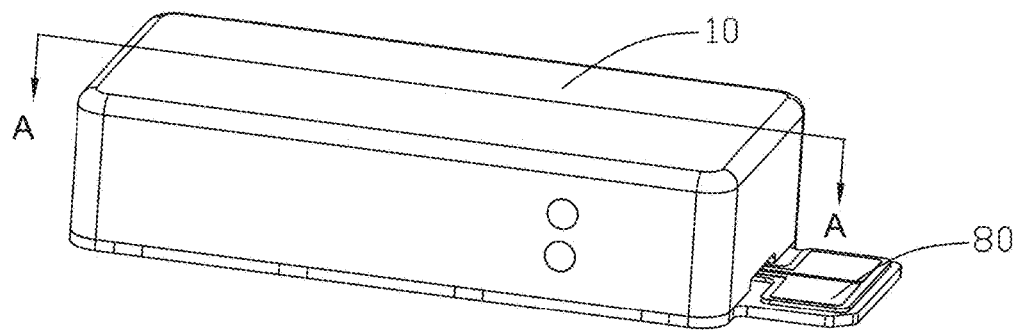
FIG. 2 is an assembled view of the vibration motor in FIG. 1.
Figure 3:
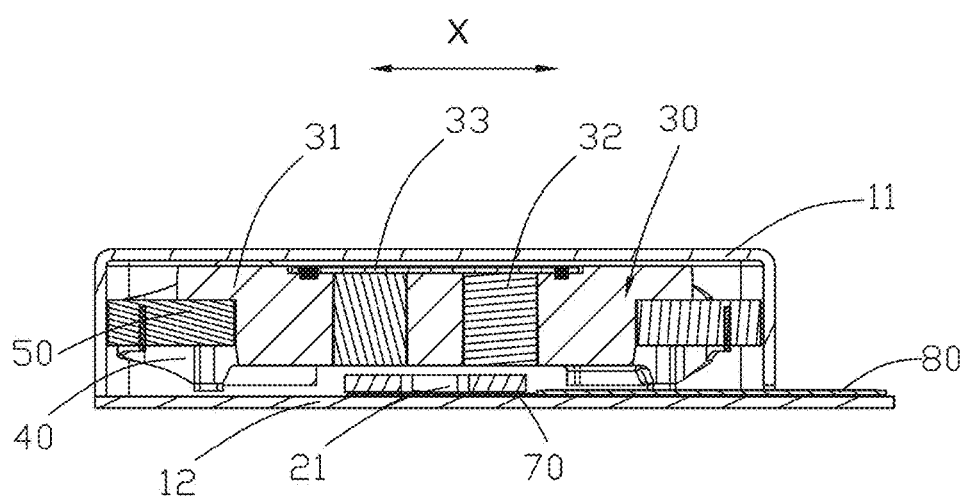
FIG. 3 is a cross-sectional view of the vibration motor taken along line A-A in FIG. 2.

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiments described hereby is only to explain this disclosure, not intended to limit this disclosure.

Referring to FIGS. 1-4, a vibration motor 100 comprises a housing 10 having an accommodating space, a fixed component 20, a vibrating component 30 and an elastic connecting piece 40 accommodated in the housing 10 approximately, wherein the housing 10 comprises a housing body 11 and a cover plate 12 covering the housing body 11 and forming the accommodating space after matching with the housing body 11. The fixed component 20 is fixed on the cover plate 12; the vibrating component 30 comprises a counterweight 31 whose two ends are held on the elastic connecting piece 40; therefore, the vibrating component 30 can be suspended in the accommodating space by using the elastic connecting piece 40 and vibrate along the length direction parallel with the cover plate 12.

The fixed component 20 comprises coils 21 fixed on the cover plate 12 in this embodiment. While the vibrating component 30 comprises at least one counterweight 31, a magnet 32 accommodated in the counterweight 31 and a pole plate 33 adhered to the end surface far from the cover plate 12 on the counterweight 31.

The fixed component 20 and the vibrating component 30 are not limited to the above-mentioned structural configuration. In fact, the components with locations which would not be changed with respect to the housing 10 can be taken as one part of the fixed component 20 in the vibration motor 100; while the components reciprocating in the accommodating space in presence of the electromagnetic induction force between the coils and the magnet can be taken as one part of the vibrating component 30. For example, the roles of the coils 21 and the magnet 32 can be exchanged in other embodiments. For example, the fixed component 20 can comprises the magnet which is fixed on the cover plate 12; while the vibrating component 30 shall include the coils correspondingly, and the coils can be suspended in the accommodating space.

Figure 4:
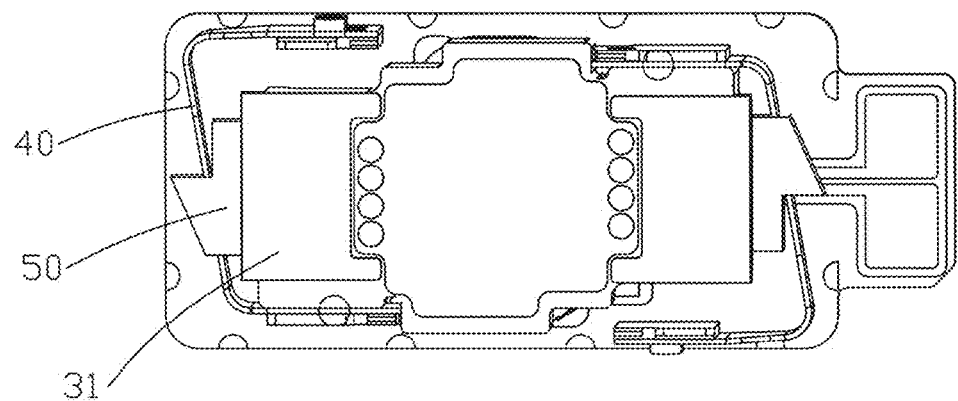
FIG. 4 is a top view of the vibration motor, with a housing body thereof being removed.
Figure 5:
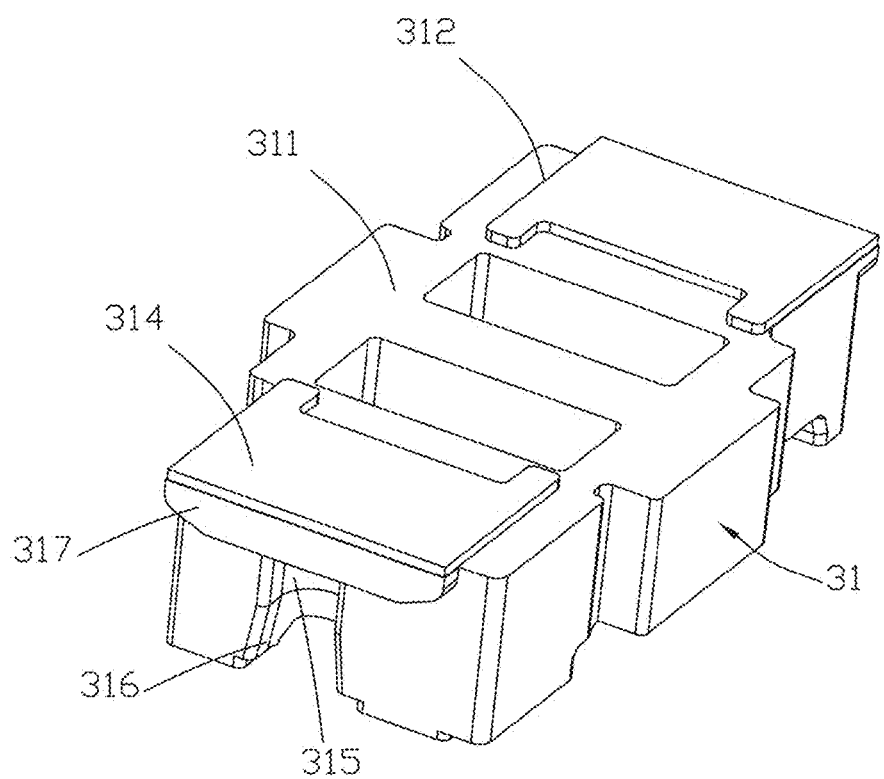
FIG. 5 is an isometric view of a counterweight of the vibration motor, from one aspect.
Figure 6:
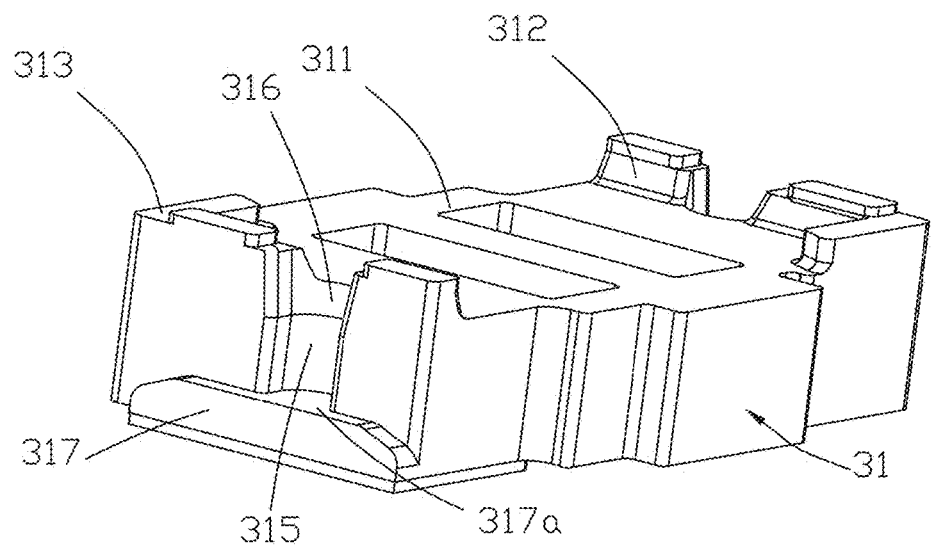
FIG. 6 is an isometric view of the counterweight, from another aspect.

Referring to FIGS. 5-6, the counterweight 31 comprises a main body 311 and side parts 312 arranged on two sides of the main body 311 in this embodiment, wherein the main body 311 is provided with at least one accommodation hole (not numbered) for accommodating the magnet 32. Further, the side parts 312 comprise a first end surface and a second end surface 314 which are arranged in parallel approximately and oppositely, wherein the first end surface 313 is the end surface close to the cover plate 12 on the counterweight 31 in the embodiment as shown in FIGS. 1-7, while the second end surface 314 is the end surface which is far from the cover plate 12 on the counterweight 31.

Further, the vibrator motor 100 also comprises a damping piece 50 fixed on the vibrating component 30. As shown in FIG. 4, the damping piece 50 is optionally arranged between the vibrating component 30 and the elastic connecting piece 40 in this embodiment. Optionally, another damping piece can be further arranged between the elastic connecting piece 40 and the housing body 11. Two damping pieces are interconnected. Optionally, one side of the damping piece 50 can be connected with the vibrating component 30 in this embodiment, and the other side is connected with the housing body 11 after coating the periphery of the elastic connecting piece. The damping piece 50 and the vibrating component 30 are complementary in structure. The damping piece 50 shall be subjected to elastic deformation along the vibrating direction of the vibrating component 30 upon being subjected to extrusion when the vibrating component 30 works in presence of the amplitude which does not exceed the normal working amplitude, in order to prevent the vibrating component 30 from being direct collided with the elastic connecting piece 40, or prevent the elastic connecting piece 40 from being direct collision with the housing body 11; therefore, the service life of the vibration motor 100 can be ensured. Moreover, the damping material for fabricating the damping piece 50 includes but is not limited to the foam, the fiber, the rubber, etc.

The counterweight 31 of the vibrating component 30 is complementary and matches with the damping piece 50 by further referring to the FIGS. 1-4 and combining with the FIGS. 5-6 in the embodiment. Specifically, the damping piece 50 comprises a projecting part 51 and the two sides (specifically two sides 312 of the counterweight 31 in the embodiment) of the counterweight 31 facing the elastic connecting piece 40 are provided with slots 315 matching with the projecting part 51; therefore, the damping piece 50 can be inserted on the counterweight 31.

Further, a glue dispensing slot 316 is formed on the side 312 of the counterweight 31 facing the elastic connecting piece 40 by means of indentation in the embodiment in order to strengthen the connecting reliability between the damping piece 50 and the counterweight 31 and prevent extra noise due to displacement of the damping piece 50, wherein the glue dispensing slot 316 extends from the first end surface 313 on the counterweight 31 along the direction pointing to the first end surface and pass through to connect with the slot 315. The glue dispensing slot 316 extends toward the geometrical center of the counterweight 31 from the first end surface 313 in the V-shaped form; thus, the glue can flow into the slot 315 more excellently by using the glue dispensing slot 316, and cannot exceed the glue dispensing slot during dispensing the glue; and the efficiency of glue dispensing and the percent of pass of the products can be improved further.

In this embodiment, a convex edge 317 is further formed on the side 312 of the counterweight 31 facing the elastic connecting piece 40 in extending and extruding way ptionally, wherein the convex edge 317 is formed in the way of extending and extruding from the second end surface 314 along the direction close to the elastic connecting piece 40. Further, the surface of the convex edge 317 close to the first end surface shall be a carrying surface 317a, wherein the shape of the carrying surface 317a shall be matched approximately with the contact surface on the damping piece 50 and contacting with the convex edge 317 ptionally.

Figure 7:
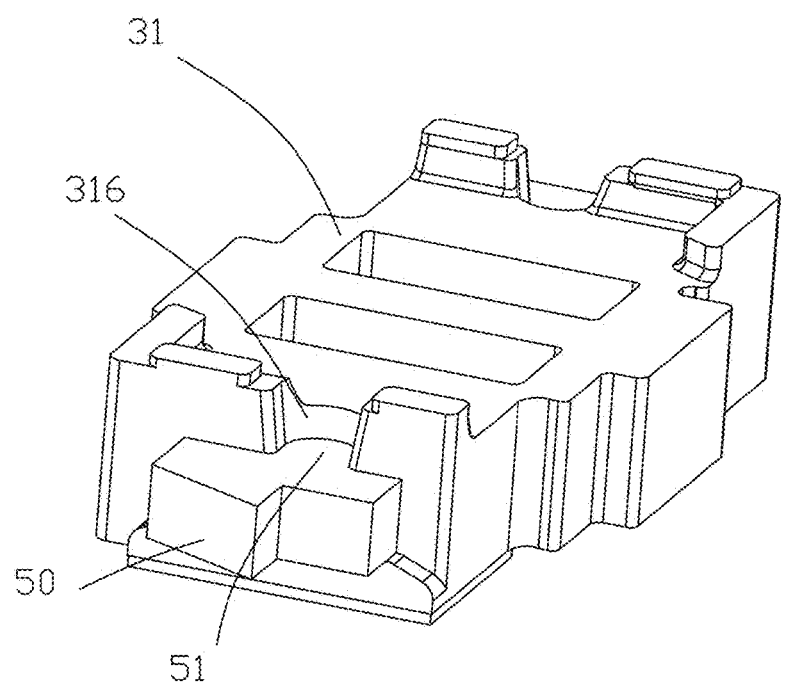
FIG. 7 is an assembled view of the counterweight and a damping piece of the vibration motor.

Therefore, the damping piece 50 shall be born on the carrying surface 317a as shown in FIG. 7 during installation, and the projecting part 51 of the damping piece 50 is inserted into the slot 315 on the counterweight 31, therefore, the damping piece 50 can be limited. Then the damping piece 50 can be fixed by using the glue dispensing slot 316 after dispensing the glue; thus, the connecting reliability between the damping piece 50 and the counterweight 31 can be strengthened.

In the other embodiments, the locations of the slot 315 and the glue dispensing slot 316 are exchangeable, that is, the glue dispensing slot 316 can extend from the second end surface 314 along the direction pointing to the first end surface 313. The slot 315 is arranged in front of the glue dispensing slot 316 in the direction pointing to the first end surface 313, and is communicated with the glue dispensing slot 316. At this time, the glue dispensing slot 316 extends toward the geometrical center of the counterweight 31 from the second end surface.

The above offers the embodiment in which the slot 315 and the glue dispensing slot 316 are arranged on the counterweight 31 and the projecting part 51 is formed on the damping piece 50 in the extending way in order to fix the damping piece 50 on the counterweight 31. However, in other embodiments, the projecting part can be arranged on the counterweight 31, and the slot matching with the projecting part can be arranged on the damping piece 50; then the glue dispensing slot communicating with the slot shall be arranged at the location on the damping piece 50 correspondingly; therefore, the connecting reliabilities between the damping piece 50 and the counterweight 31 can be further strengthened by means of the glue dispensing slot when the damping piece 50 and the counterweight 31 are inserted into each other, specifically for example, the damping piece 50 can have a third end surface and a fourth end surface parallel with the cover plate and arranged oppositely. Further, the glue dispensing slot can extend along the direction pointing to the fourth end surface from the third end surface of the damping piece. At this time, the glue dispensing slot shall extend toward the geometrical center of the damping piece 50 from the third end surface.

Further, in the above-mentioned embodiments, the vibrating component 30 comprises the counterweight 31 and the magnet 32. However, in other embodiments of the utility model, the vibrating component 30 can include coils and the counterweight. At this time, the coils are accommodated in the counterweight, and the glue dispensing slot is processed on the counterweight identically.

As further shown in FIGS. 1-4, the elastic connecting piece 40 is presented as U-shape approximately for holding the two ends of the counterweight 31 in the embodiment, wherein the elastic connecting piece 40 comprises a first connecting part 41 connecting with the counterweight 31, a second connecting part 42 connecting with the housing body 11 and a middle connecting part 43 connecting the first connecting part 41 with the second connecting part 42 approximately. In this embodiment, one side of the damping piece 50 is inserted to the counterweight 31, and the other side thereof is connected with the housing body 11 after coating the periphery of the middle connecting part 43. Further, the vibration motor 100 also comprises at least a spacer 60 arranged on the first connecting part 41 and/or the second connecting part 42 Optionally; therefore, the connecting strength between the first connecting part 41 and the counterweight 31 and/or between the second connecting part 42 and the housing body 11 can be increased.

As further shown in FIGS. 1-4, the vibration motor 100 also comprises a magnetic conduction plate 70 arranged between the coils 21 and the cover plate 12 in this embodiment; and the magnetic conduction plate 70 is a soft magnetic plate and prepared from the silicon steel sheet or the ferrite Optionally in this embodiment. Further, the vibration motor 100 also comprises a circuit board 80 arranged on the cover plate 12, wherein the circuit board 80 is connected with the coils 21 electrically in order to electrify the coils 21. Moreover, the circuit board 80 refers to the soft circuit board optionally in this embodiment.

The following shall introduce the working principle of the vibration motor of the utility model briefly by combining with the FIGS. 1-7.

The periodic electric signal shall be charged into the coils 21 by using the circuit board 80 when the vibration motor 100 works; therefore, the magnet 32 shall be subjected to the force from the periodic magnetic field. Moreover, the vibrating component 30 shall be driven to reciprocate in presence of support of the elastic connecting piece 40 along the length direction (referring to the direction of X shaft in FIG. 3) parallel with the cover plate 12 because the stressing direction of the magnet 32 would be changed due to changes of the direction of the current along with the time.

The damping piece 50 in the embodiment is born on the carrying surface 317a of the convex edge 317 and is inserted into the counterweight 31; therefore, the damping piece 50 can be limited, and then fixed in the way of dispensing glue by using the glue dispensing slot 316. The glue can be dispensed by means of the glue dispensing slot 316 when the vibration motor of the utility model is used, and the glue would not exceed the glue dispensing slot 316 on the counterweight 31. Therefore, the product performance of the vibration motor can be ensured, the efficiency of dispensing glue and the percent of pass of the product can be improved.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:
    a housing;
    a fixed component;
    an elastic connecting piece;
    a vibrating component comprising a counterweight suspended by the elastic connecting piece; one of the fixed component and the vibrating component comprising a coil, and the other comprising a magnet;
    a damping piece fixed on the counterweight and facing the elastic connecting piece; wherein
    one of the counterweight and the damping piece is provided with a slot and a glue dispersing slot connecting with the slot, and a projecting part formed on the other of the counterweight and the damping piece for matching with the slot.

2. The vibration motor as described in claim 1, wherein the housing comprises a housing body and a cover plate covering the housing body; the side of the counterweight, facing the elastic connecting piece, is provided with a first end surface and a second end surface parallel with the cover plate and arranged oppositely; and the glue dispensing slot extends the direction pointing to the second end surface from the first end surface of the counterweight and extends toward the geometrical center of the counterweight from the first end surface.

3. The vibration motor as described in claim 2, wherein a convex edge is also formed on the side on the counterweight, facing the elastic connecting piece in the extending and extruding way, further the convex edge is formed from the second end surface along the direction close to the elastic connecting piece in the extending and extruding way.

4. The vibration motor as described in claim 3, wherein the surface of the convex edge facing the first end surface serves as a carrying surface; the damping piece is carried by carrying surface; and the shape of the carrying surface is matched with the contact surface corresponding to the damping piece.

5. The vibration motor as described in claim 2, wherein the first end surface is the end surface close to the cover plate on the counterweight.

6. The vibration motor as described in claim 2, wherein the elastic connecting piece comprises a first connecting part connecting with the counterweight, a second connecting part connecting with the housing body of the housing and a middle connecting part connecting the first connecting part with the second connecting part; and the vibration motor also comprises at least a spacer which is arranged on the first connecting part and/or the second connecting part.

7. The vibration motor as described in claim 6, wherein one side of the damping piece is inserted into the counterweight, and the other side thereof is connected with the side of the middle connecting part facing the counterweight.

8. The vibration motor as described in claim 6, wherein one side of the damping piece is inserted into the counterweight, and the other side thereof is connected with the housing body after coating the middle connecting part.

9. The vibration motor as described in claim 2, wherein the housing comprises the cover plate on which the fixed component is fixed; the vibrating component comprises the magnet and a pole plate, wherein the magnet is accommodated in the counterweight, and the pole plate is adhered to the end surface of the counterweight far away from the cover plate.

10. The vibration motor as described in claim 1, wherein the housing comprises a housing body and a cover plate covering the housing body; the damping piece has a third end surface and a fourth end surface parallel with the cover plate and arranged oppositely; and the glue dispensing slot extends along the fourth end surface from the third end surface of the damping piece and extends toward the geometrical center of the damping piece from the third end surface.

* * * * *